United States Patent
Anghel et al.

(10) Patent No.: US 7,388,300 B2
(45) Date of Patent: Jun. 17, 2008

(54) STARTER-GENERATOR OPERABLE WITH MULTIPLE VARIABLE FREQUENCIES AND VOLTAGES

(75) Inventors: Cristian E. Anghel, Tucson, AZ (US); Mingzhou Xu, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 91 days.

(21) Appl. No.: 11/524,661

(22) Filed: Sep. 20, 2006

(65) Prior Publication Data

US 2008/0067984 A1    Mar. 20, 2008

(51) Int. Cl.
*H02P 9/10* (2006.01)
(52) U.S. Cl. .............. 290/39; 290/31; 322/46
(58) Field of Classification Search ........... 290/4 R, 290/5, 31, 36 R, 39; 322/29, 37, 46
See application file for complete search history.

(56) References Cited

U.S. PATENT DOCUMENTS

| | | | |
|---|---|---|---|
| 3,197,660 A | 7/1965 | Leischner | |
| 3,930,175 A | 12/1975 | Chirgwin | |
| 4,039,910 A | 8/1977 | Chirgwin | |
| 4,039,922 A | 8/1977 | Chirgwin | |
| 4,093,869 A * | 6/1978 | Hoffmann et al. | 290/31 |
| 4,968,926 A * | 11/1990 | Dhyanchand | 322/10 |
| 5,594,322 A * | 1/1997 | Rozman et al. | 322/10 |
| 5,764,036 A | 6/1998 | Vaidya et al. | |
| 6,100,620 A | 8/2000 | Radovsky | |
| 6,844,707 B1 * | 1/2005 | Raad | 322/29 |
| 6,998,726 B2 * | 2/2006 | Sarlioglu et al. | 290/31 |
| 7,034,509 B2 | 4/2006 | Kusko | |
| 7,045,986 B2 * | 5/2006 | Anghel et al. | 318/712 |
| 7,122,994 B2 * | 10/2006 | Anghel et al. | 322/60 |

* cited by examiner

*Primary Examiner*—Nicholas Ponomarenko
(74) *Attorney, Agent, or Firm*—Oral Caglar, Esq.

(57) ABSTRACT

A starter-generator system is configured to be operable at multiple variable frequencies. The starter-generator includes a rotor and a stator. The rotor is configured to rotate and has a single main field winding wound thereon. The stator has at least a first stator winding set and second stator winding set independently wound thereon. Upon electrical excitation and rotation of the rotor the starter-generator supplies electrical power from each of the stator winding sets at different frequencies. Also, upon electrically exciting one or both of the stator winding sets with appropriate AC power, the rotor will rotate and generate a starting torque.

20 Claims, 9 Drawing Sheets

STARTER-GENERATOR OPERABLE WITH MULTIPLE VARIABLE FREQUENCIES AND VOLTAGES

TECHNICAL FIELD

The present invention relates to rotating electrical machines such as starter-generators for gas turbine engines and, more particularly, to a brushless starter-generator operable at multiple frequencies and voltages.

BACKGROUND

Aircraft are being designed to use electrical power more, and various other sources of power, such as hydraulic and pneumatic sources, less. Aircraft system architectures that rely either solely, or in greater abundance, upon electrical power are sometimes referred to as More Electric Architecture (MEA) systems. Typically, MEA systems use starter-generators to both start the aircraft main engines and supply electrical power to various system loads. These various system loads may utilize electrical power at various frequencies and voltages. Thus, many MEA systems, and/or the starter-generators that are currently used to power MEA systems, typically include relatively complex and heavy power electronics circuits. For example, some systems may include inverters, for converting DC to AC power, rectifiers, for converting AC power to DC power, and potentially complex voltage and frequency control circuits, which can increase overall complexity, cost, and maintenance.

Although brush-type DC machines may alleviate the need for some of these complex and heavy electronic circuits, these also suffer certain drawbacks. For example, the brushes tend to wear fairly quickly, which can reduce machine reliability and increase the need for periodic maintenance and cleaning. Some brush-type DC machines can also suffer what is known as torque ripple during startup. In some instances, the torque ripple can be large, which can result in poor starter performance.

Hence, there is a need for a generator that can be used to supply various loads and does not rely on relatively complex and heavy inverters and frequency control circuits for proper operation, and/or does not suffer reduced reliability from brush wear, and/or the need for potentially frequent maintenance and cleaning, and/or does not experience significant torque ripple during startup. The present invention addresses one or more of these needs.

BRIEF SUMMARY

The present invention provides a starter-generator system that supplies electrical power at a plurality of frequencies and voltages, and a controllable torque to a gas turbine engine, to thereby assist in starting the gas turbine engine.

In one embodiment, and by way of example only, a starter-generator includes a rotor and a stator. The rotor is configured to rotate and has a single main field winding wound thereon that, upon electrical excitation thereof, generates an electromagnetic flux. The stator is disposed at least partially around at least a portion of the rotor and has at least a first stator winding set and second stator winding set independently wound thereon. The first stator winding set is configured to implement a first number of stator poles and, upon receipt of the electromagnetic flux, to have AC currents induced therein at a first frequency. The second stator winding set is configured to implement a second number of stator poles and, upon receipt of the electromagnetic flux, to have AC currents induced therein at a second frequency. The first and second numbers of stator poles are unequal and the first and second frequencies are unequal.

In another exemplary embodiment, a starter-generator includes a stator and a rotor. The stator has at least a first stator winding set and second stator winding set independently wound thereon. The first stator winding set is configured to implement a first number of stator poles and, upon electrical excitation thereof with AC power of a first frequency, to generate a magnetic field that rotates at a first speed. The second stator winding set is configured to implement a second number of stator poles and, upon electrical excitation thereof with AC power of a second frequency, to generate a magnetic field that rotates at a second speed. The rotor is disposed at least partially within at least a portion of the stator and is configured to rotate. The rotor has a single main field winding wound thereon that electromagnetically interacts with one or more of rotating the magnetic fields, to thereby generate a torque and rotate. The first and second numbers of stator poles are unequal and the first and second frequencies are unequal.

In still another exemplary embodiment, a starter-generator includes a rotor and a stator. The rotor is configured to rotate and has a single main field winding wound thereon. The stator has at least a first stator winding set and second stator winding set independently wound thereon. The first stator winding set is configured to implement a first number of stator poles, and the second stator winding set configured to implement a second number of stator poles. The single main field winding, upon electrical excitation thereof, generates an electromagnetic flux, and upon electromagnetic interaction with one or more rotating magnetic fields, generates a torque and causes the rotor rotate. The first stator winding set is configured such that upon receipt of the electromagnetic flux generated by the single main field winding, AC currents are induced therein at a first frequency, and upon electrical excitation thereof with AC power of a first frequency, a magnetic field that rotates at a first speed is generated thereby and interacts with the single main field winding. The second stator winding set is configured such that upon receipt of the electromagnetic flux generated by the single main field winding, AC currents are induced therein at a second frequency, and upon electrical excitation thereof with AC power of a second frequency, a magnetic field that rotates at a second speed is generated thereby and interacts with the single main field winding. The first and second number of stator poles are unequal, and the first and second frequencies are unequal.

Other independent features and advantages of the preferred starter-generator system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background or the following detailed description. In this regard, although the starter-generator is described herein as being used with, for example, an aircraft gas turbine engine, it will be appreciated that may it be used as a starter-generator with gas turbine engines in numerous other environments including, for example, space, marine, land, or other vehicle-related applications where gas turbine engines are used.

Figure 1:
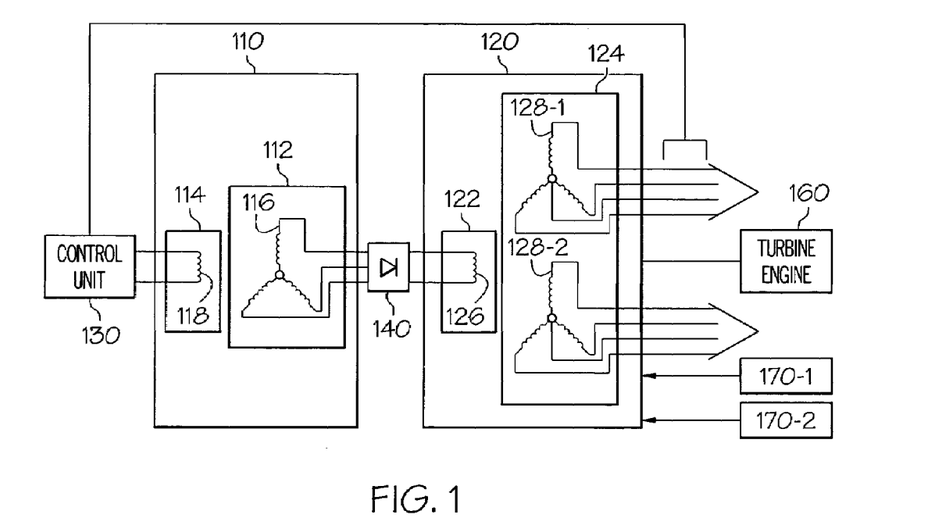
FIG. 1 is a functional schematic diagram of an exemplary generator system according to an embodiment of the present invention.

Turning now to FIG. 1, a functional schematic diagram of an exemplary starter-generator system 100 for use with, for example, an aircraft gas turbine engine, is depicted. This exemplary starter-generator system 100 includes an exciter 110, which includes an exciter rotor 112 and an exciter stator 114, a main starter-generator 120, which includes a main rotor 122 and a main stator 124, a generator control unit 130, and one or more a rectifier assemblies 140. It will be appreciated that the starter-generator system 100 may include one or more additional components, sensors, or controllers such as, for example, a permanent magnet generator (PMG), or a rotational speed sensor. However, a description of these additional components, sensors, and controllers, if included, is not needed, and will therefore not be further depicted or described.

Figure 2:
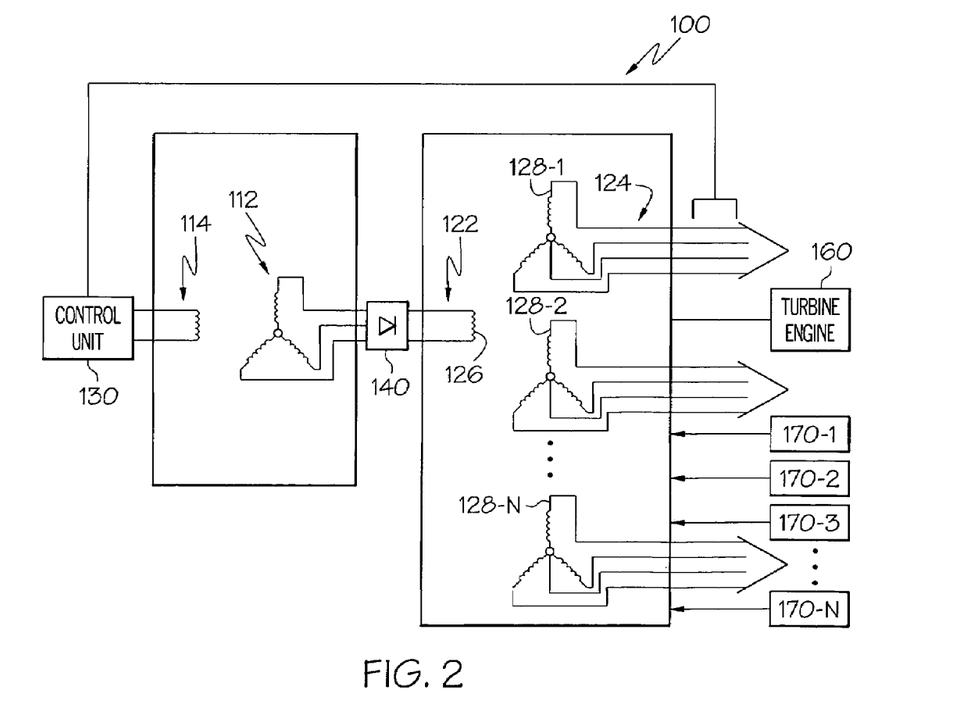
FIG. 2 is a functional schematic diagram of an exemplary generator system according to an alternative embodiment of the present invention.

In the depicted embodiment, the exciter rotor 112 has a set of multi-phase (e.g., three-phase) exciter armature windings 116 wound thereon, the exciter stator 114 has a single exciter field winding 118 wound thereon, the main rotor 122 has a single main field winding 126 wound thereon, and the main stator 124 has a plurality of independent multi-phase (e.g., three-phase) stator winding sets 128-1, 128-2 wound thereon. Although only two independent stator winding sets 128-1, 128-2 are depicted in FIG. 1, it will be appreciated that this is merely exemplary of a particular preferred embodiment and that in alternative embodiments the starter-generator system 100 could be implemented with more than this number of independent stator winding sets 128. For example, an embodiment that includes N-number of independent stator winding sets 128-1, 128-2, 128-3, . . . , 128-N is depicted in FIG. 2.

When the starter-generator system 100 is operating in a generator mode, the shaft 150 receives a rotational drive force from, for example, an aircraft gas turbine engine 160, which causes the PMG rotor 112, the exciter rotor 122, and the main rotor 132 to all rotate at the same rotational speed. No matter the specific number of stator winding sets 128 that are included, when the starter-generator system 100 is operating in a generator mode, the exciter rotor 112 and the main rotor 122, both of which are configured to rotate, are supplied with a rotational drive force from, for example, an aircraft gas turbine engine 160, and thus rotate, preferably at the same rotational speed. The rotational speed of the engine 160, and thus these starter-generator system components, may vary. For example, the rotational speed may vary in the range of about 12,000 rpm to about 24,000 rpm. It will be appreciated that this rotational speed range is merely exemplary, and that various other speed ranges may be used.

No matter the specific rotational speed range, it will be appreciated that when the starter-generator system 100 is operating in the generator mode, the generator control unit 130 supplies AC power to the exciter field winding 118, which induces AC currents in the exciter armature windings 116. The rectifier assemblies 140, which are electrically coupled between the exciter armature windings 116 and the main field winding 126, rectify the AC currents and supply DC current to the main field winding 126.

As the main field winding 126 rotates, AC currents are induced in each of the stator winding sets 128. In particular, the main filed winding 126 and the stator winding sets 128 are wound such that the AC currents are induced at different frequencies in each stator winding set 128. For example, in the embodiment depicted in FIG. 1, in which the stator 124 is wound with two independently wound stator winding sets 128-1, 128-2, AC currents at a first frequency are induced in the first stator winding set 128-1, and AC currents at a second frequency, which is preferably unequal to the first frequency, are induced in the second stator winding set 128-2.

When the starter-generator system 100 is operating in the motor mode, AC power is supplied to the exciter stator 114, and to one or more of the stator winding sets 128. In the depicted embodiment, the control unit 130 supplies the AC power to the exciter stator 114, and AC power from one or more controlled frequency AC power sources 170 (e.g., 170-1, 170-2, 170-3, . . . 170-N) is supplied to one or more of the stator winding sets 128. It will be appreciated that the particular controlled frequency AC power sources 170 may vary, and may include, for example, one or more power sources in the control unit 130, one or more aircraft auxiliary power units (APUs), and/or one or more external power sources. No matter the specific source (or sources) of the controlled frequency AC power, it will be appreciated that each source 170 is preferably configured to supply AC power at a different controlled frequency. For example, in the embodiment depicted in FIG. 1, in which the stator 124 is wound with two independently wound stator winding sets 128-1, 128-2, either or both stator winding sets 128-1, 128-2 may be energized with AC power from two different controlled frequency AC power sources 170-1, 170-2, each of which is configured to supply AC power at different frequencies.

The supplied AC power, as is generally known, generates a rotating magnetic field in one or both of the stator winding sets 128-1, 128-2, which interacts with currents induced in the main field winding 126 from the exciter 110, causing the main rotor 122 to rotate. As the main rotor 122 rotates, the exciter 110 also rotates. A non-illustrated position sensing device, such as a resolver unit, may also be included in the system 100 to supply a signal representative of the main rotor 122 position to the control unit 130. This position signal is used to control the stator 128 current such that the maximum torque is generated. It will be appreciated, however, that a position sensing device need not be included in the starter-generator system 100. Instead, the position signal may be produced using a sensorless method, in which the position is derived from various electrical signals in the starter-generator system 100.

From the above, it is seen that the starter-generator system 100 can be used to supply AC power at a plurality of frequencies, and to convert one or more sources of AC power of a plurality of controlled frequencies to mechanical torque. To do so, and as was noted above, the stator 124 is wound with a plurality of independent stator winding sets 128, each of which is preferably a multi-phase (e.g., three-phase) winding set that is configured to implement a different number of stator poles. The single main field winding 126 is configured, upon being supplied with electrical excitation, from either the exciter armature windings 116 and rectifier assemblies 140 or from the control unit 130, to generate a magnetomotive force (MMF), and thus an air gap electromagnetic flux (EMF), equivalent to that which a rotor wound a plurality of windings of different pole numbers would generate. A particular preferred configuration whereby the single main field winding 126 and the independent stator winding sets 128 can provide this functionality will now be described. In doing so it is noted that the following description, for clarity and ease of explanation, is for the starter-generator system 100 depicted in FIG. 1, in which the stator 114 has two independent stator winding sets 128-1, 128-2 wound thereon.

Figure 3:
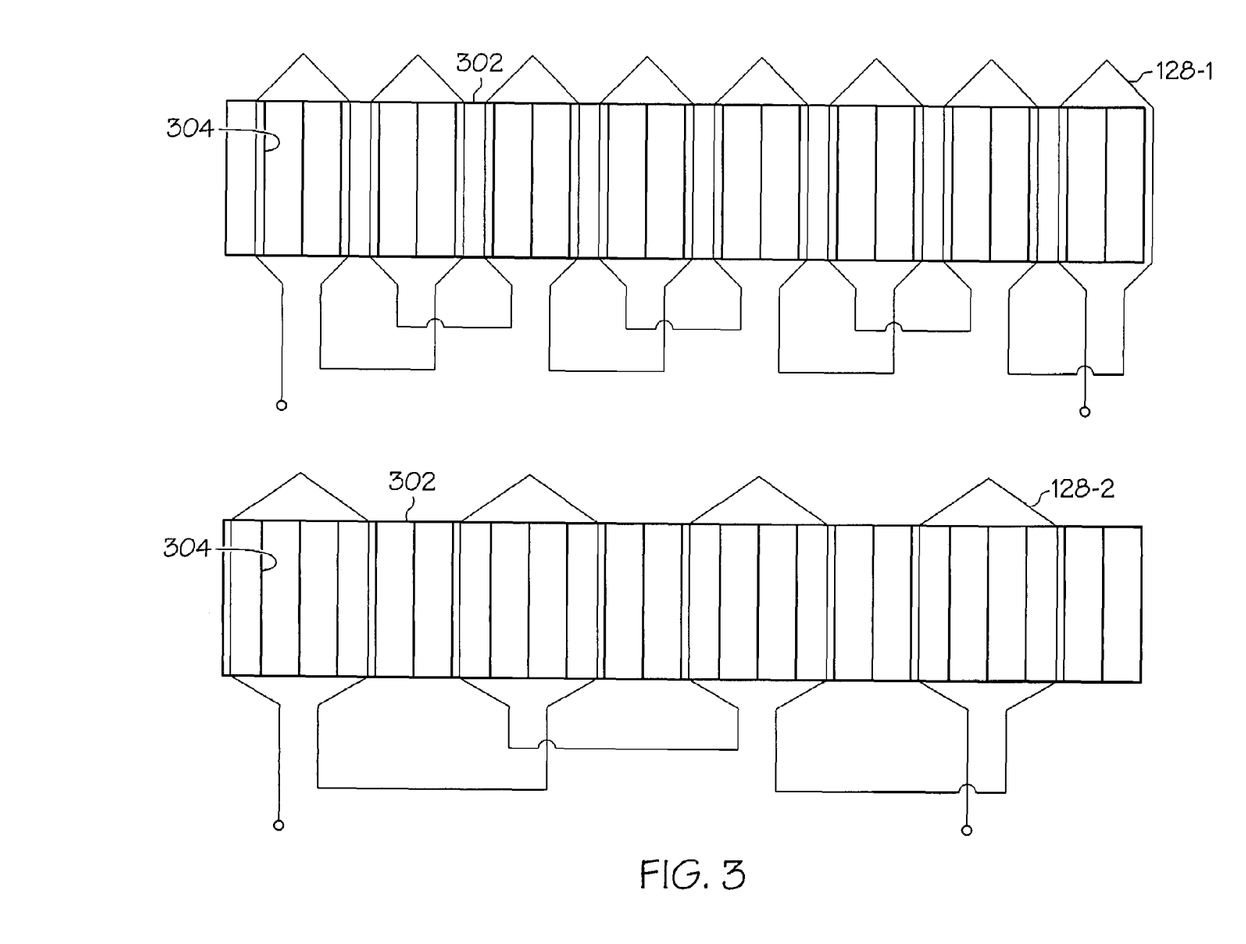
FIG. 3 is a simplified schematic representation of a single phase of two stator windings wound on a stator that may be used to implement the generator system of FIG. 1.

Turning first to FIG. 3, a simplified schematic representation of a single phase of each stator winding set 128-1, 128-2 wound on the stator 114 is depicted. The stator 114, at least in the depicted embodiment, includes a stator core 302 having a plurality of slots 304 formed therein. In the depicted embodiment, the stator core 302 has 24 slots 304 formed therein, though it will be appreciated that this is merely exemplary, and that the stator core 302 could be implemented, if needed or desired, with more than this number of slots 304. Nonetheless, it is seen that in the depicted embodiment the first stator winding 128-1 is wound on the stator core 302 to implement eight stator poles, and the second stator winding 128-2 is wound to implement four stator poles. It will additionally be appreciated that these numbers of stator poles are merely exemplary and may be selected to meet design requirements and/or to supply AC power at desired frequencies.

Before proceeding further, it was noted above that only a single phase of each stator winding set 128 is depicted in FIG. 3. This is done for clarity and ease of depiction, and the skilled artisan will appreciate that each stator winding set 128 preferably includes two additional windings, one for each of the two additional phases. The manner in which each of the non-depicted windings associated with each stator winding set 128 would be wound on the depicted stator core 302 would be readily apparent to the skilled artisan. As such, depiction and description of these windings and the manner in which these windings are wound on the stator core 302 need not, and will not, be further described.

Figure 4:
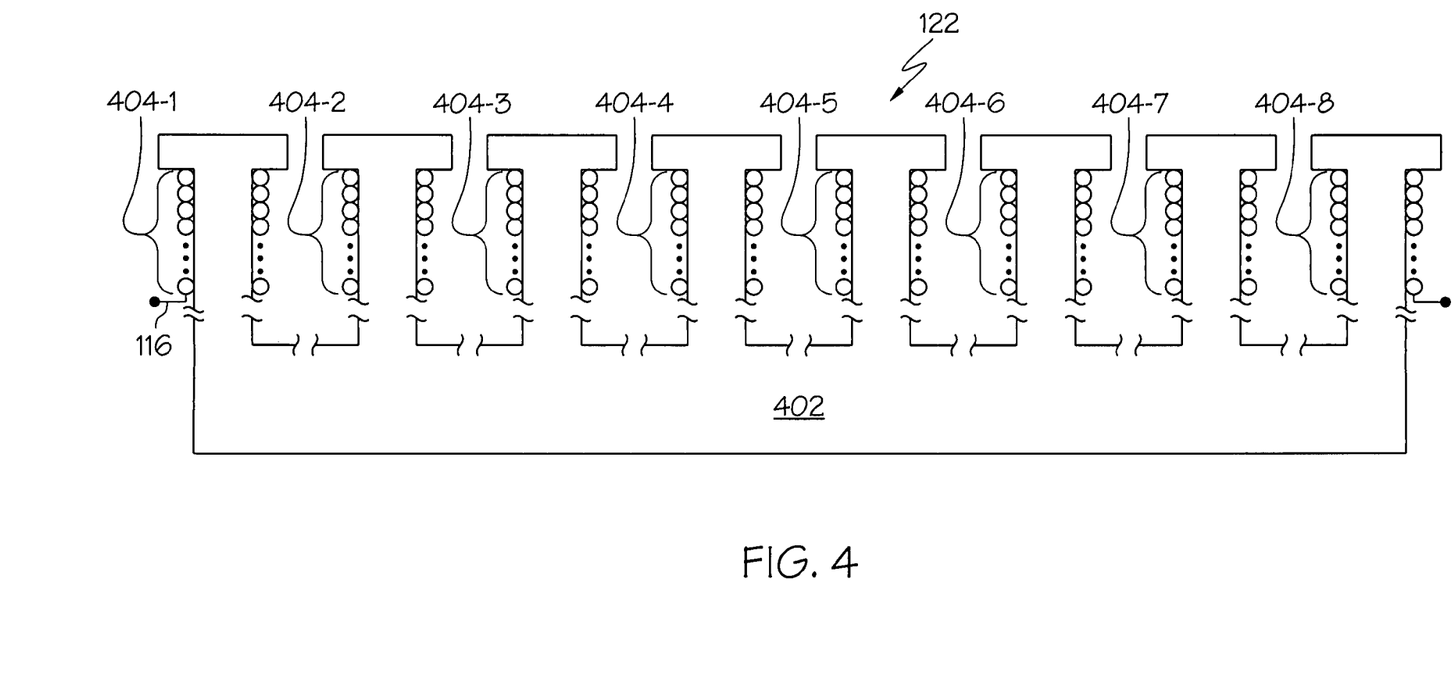
FIG. 4 is a simplified schematic representation of a portion of a rotor that may be used to implement the generator system of FIG. 1.

Turning now to FIG. 4, a simplified schematic representation of a portion of the main rotor 122 is depicted. The main rotor 122 includes a rotor core 402 and the main field winding 116. The rotor core 402 is depicted in FIG. 4 as being implemented in a salient pole configuration. It will be appreciated, however, that this is merely exemplary, and that the rotor core 402 could be alternatively implemented. For example, the rotor core 402 could be implemented in a cylindrical configuration. No matter the specific configuration of the rotor core 402 it is seen that the main field winding 116 is wound on the rotor core 402 such that it comprises a plurality of rotor coils 404 (e.g., 404-1, 404-2, 404-3, . . . , 404-N) that are electrically coupled in series. Each rotor coil 404 includes a number of turns and is wound such that, upon the main field winding 116 being electrically excited with DC current, it generates an MMF, and concomitantly an EMF. However, unlike main field winding configurations presently implemented in known generators, the MMF generated by each rotor coil 404 is not equivalent in magnitude. Rather, the rotor coils 404 are wound such that the MMF generated by the main field winding 116 is equivalent to that generated by a plurality of field windings that are each independently wound on the same rotor core to implement a different number of rotor poles.

Figure 5:
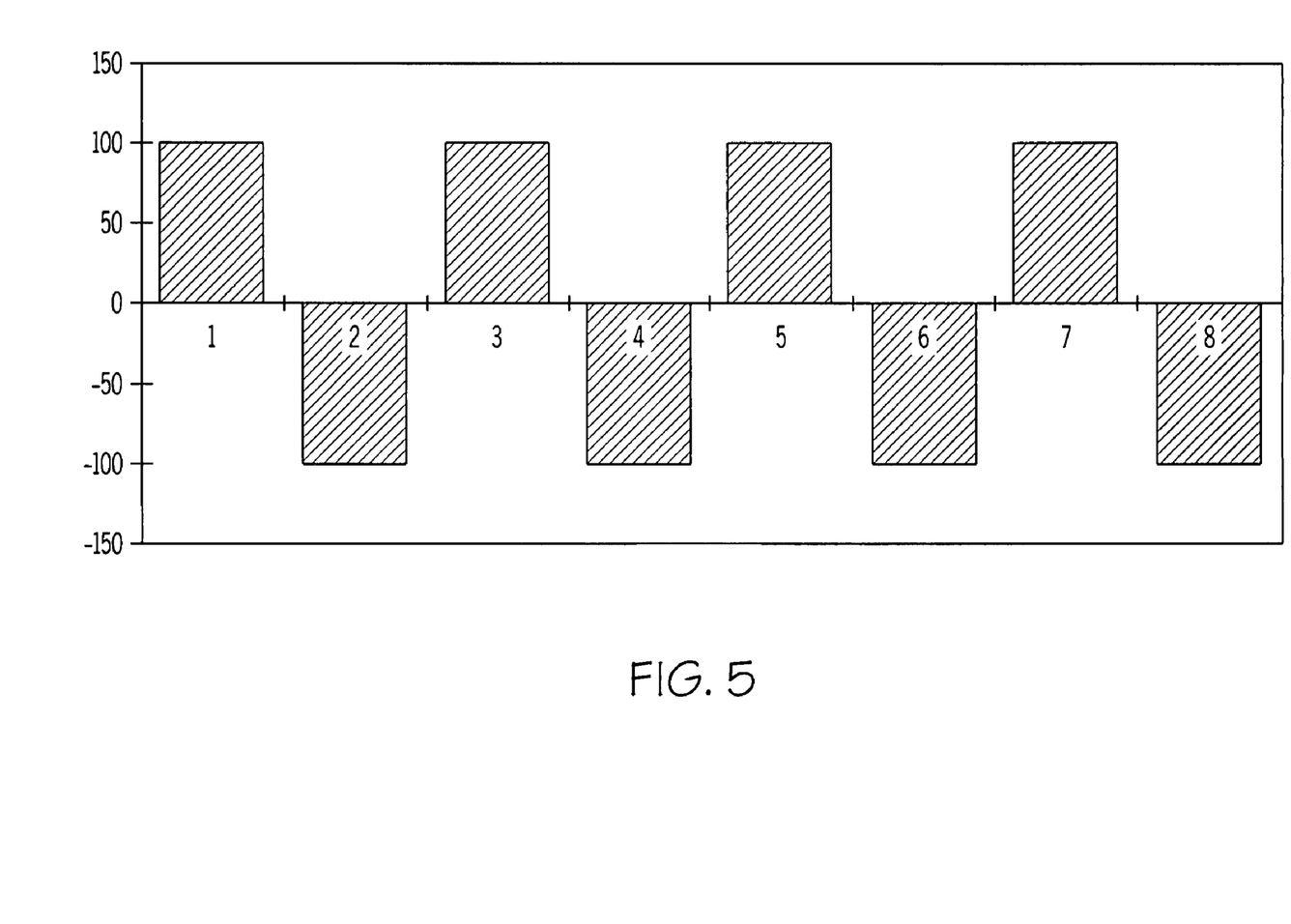
FIG. 5 is a graph depicting the magnetomotive force (MMF) distribution generated by an exemplary 8-pole rotor.
Figure 6:
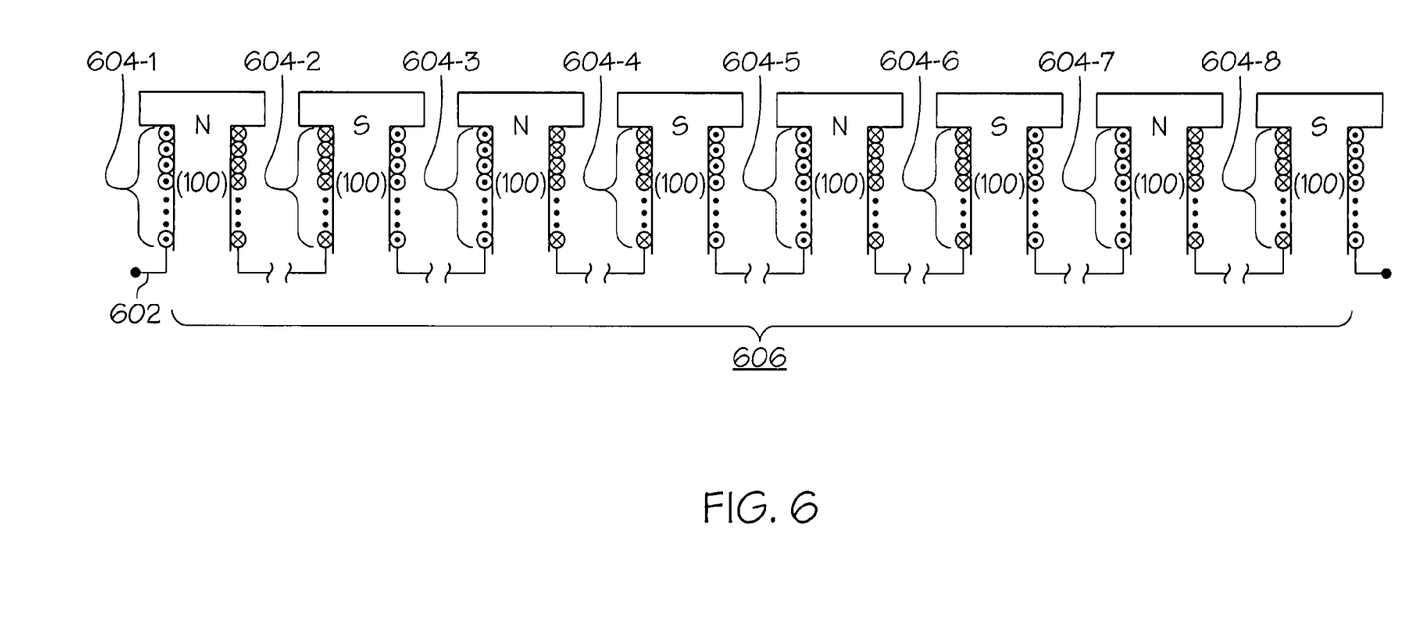
FIG. 6 is a schematic representation of the 8-pole rotor that generates the MMF distribution of FIG. 5.
Figure 7:
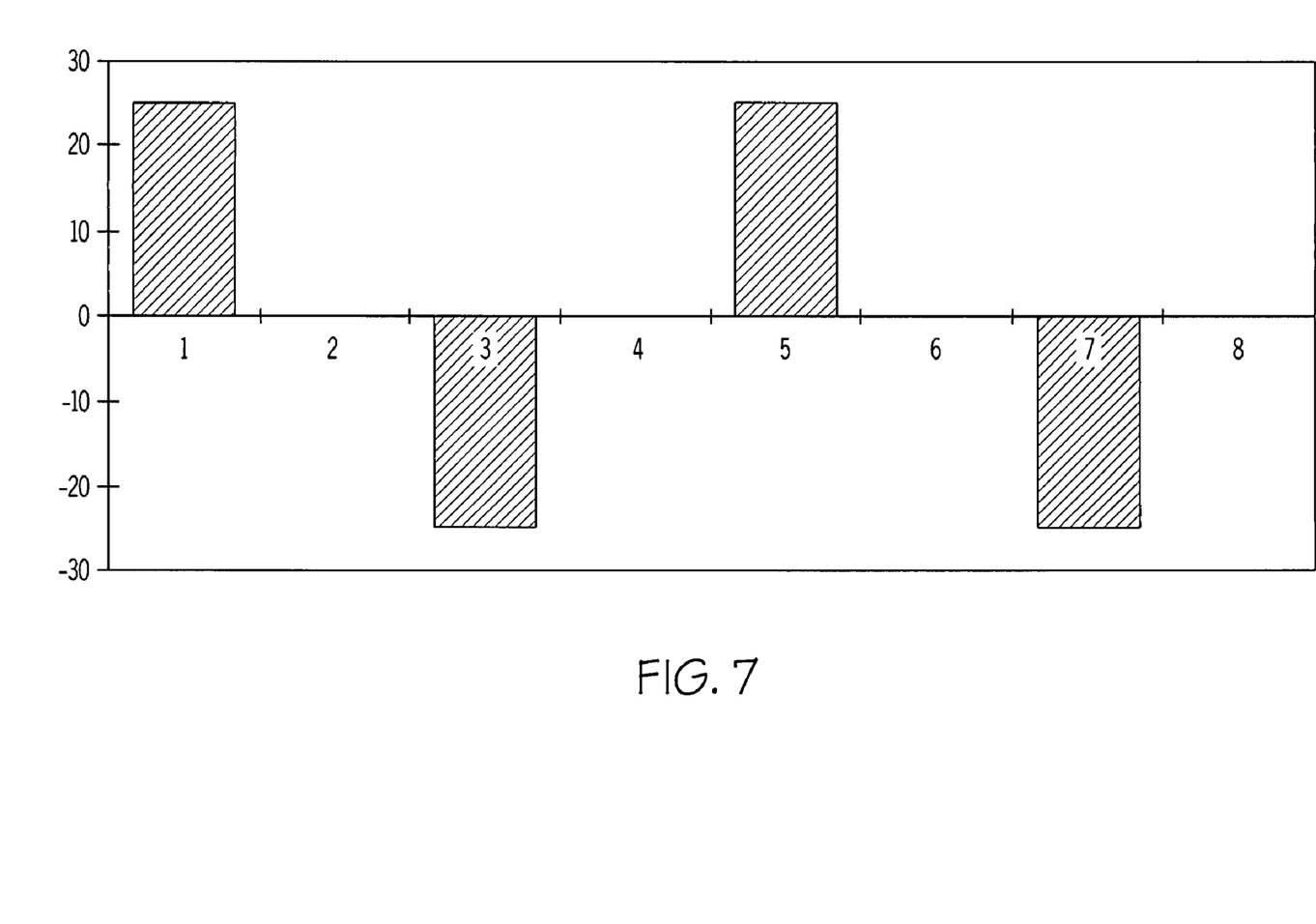
FIG. 7 is a graph depicting the (MMF) distribution generated by an exemplary 4-pole rotor.
Figure 8:
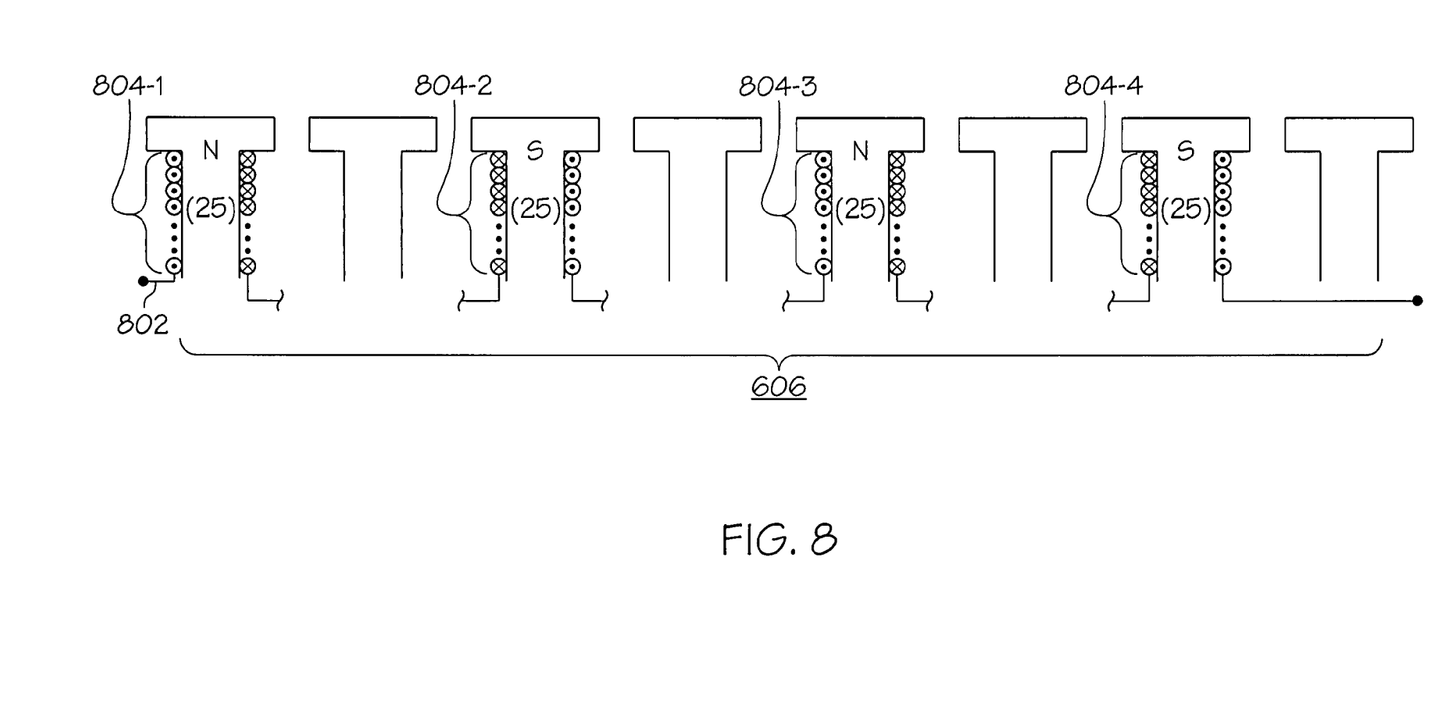
FIG. 8 is a schematic representation of the 4-pole rotor that generates the MMF distribution of FIG. 7.

To explain how the single main field winding 116 implements the above-described functionality, reference should now be made to FIGS. 5-8, which depict the MMF distribution generated by, and conventional rotor configurations to implement, an 8-pole rotor and a 4-pole rotor. More specifically, FIG. 5 graphically depicts the MMF distribution generated by an 8-pole rotor configuration, which is depicted in FIG. 6, and in which the main field winding 602 includes eight coils 604 (e.g., 604-1, 604-2, 604-3, . . . , 604-8) wound on a rotor core 606, each having 100 turns (referenced parenthetically adjacent each coil). Similarly, FIG. 7 graphically depicts the MMF distribution generated by a 4-pole rotor configuration, which is depicted in FIG. 8, and in which the main field winding 802 includes four coils 804 (e.g., 804-1, 804-2, 804-3, 804-4) wound on the same rotor core 606 as in FIG. 6, each having 25 turns. It will be appreciated that if the rotor 112 were configured to simultaneously generate both the 8-pole MMF distribution and the 4-pole MMF distribution depicted in FIGS. 5 and 7, respectively, the stator winding sets 128-1, 128-2 would each supply AC currents, when interacting with the rotor winding 126, at a different frequency. In particular, given the ratio of the number of stator poles and rotor poles, the first stator winding set 128-1 would supply AC current at a frequency twice that supplied by the second stator winding set 128-2. It will additionally be appreciated that, given the ratio of the generated MMF distributions, the electrical power supplied by the first stator winding set 128-1 would be four times that supplied by the second stator winding set 128-2.

Figure 9:
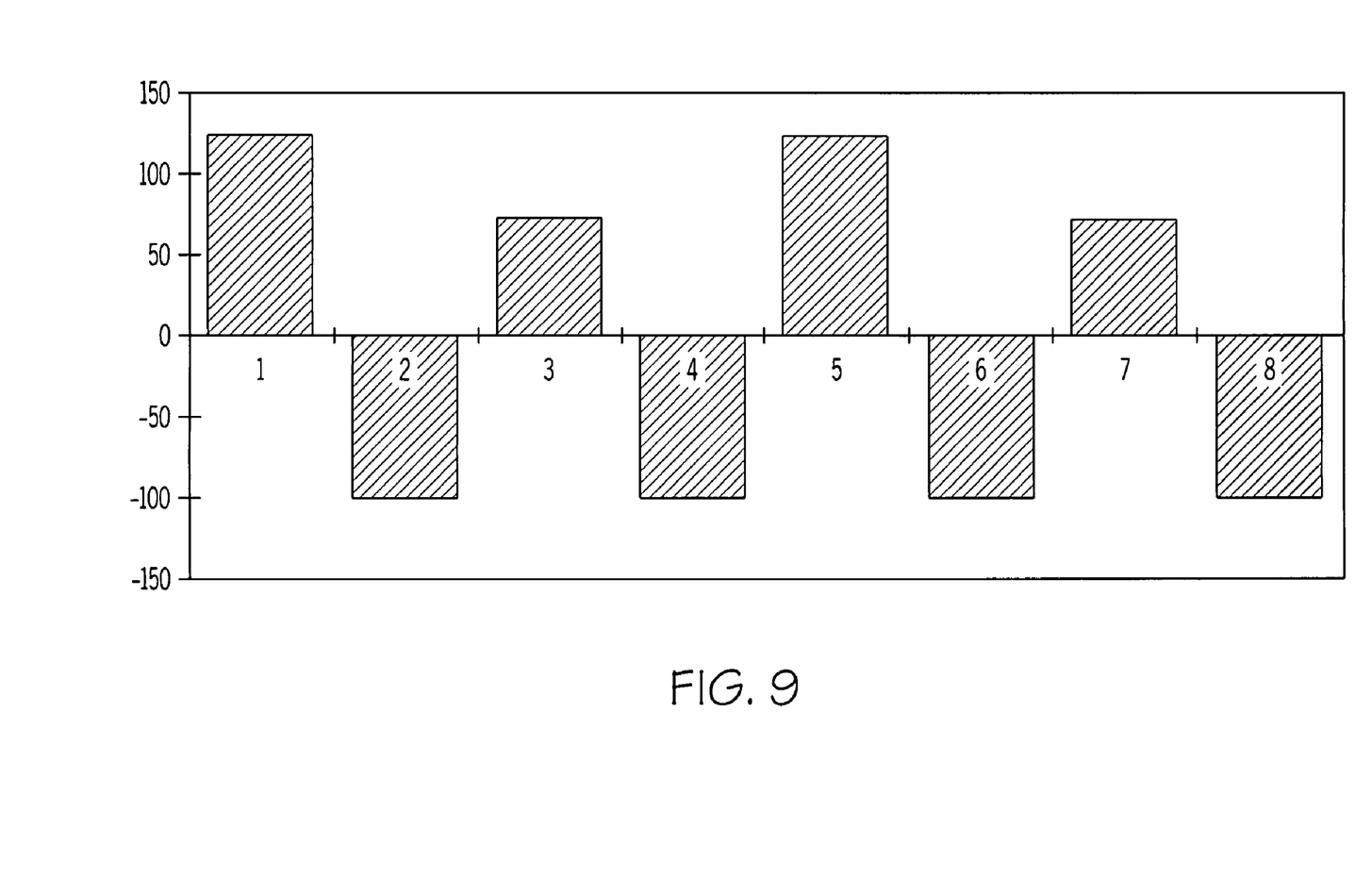
FIG. 9 is a graph depicting the MMF force distribution generated by an exemplary rotor that is used in the generator system of FIG. 1.
Figure 10:
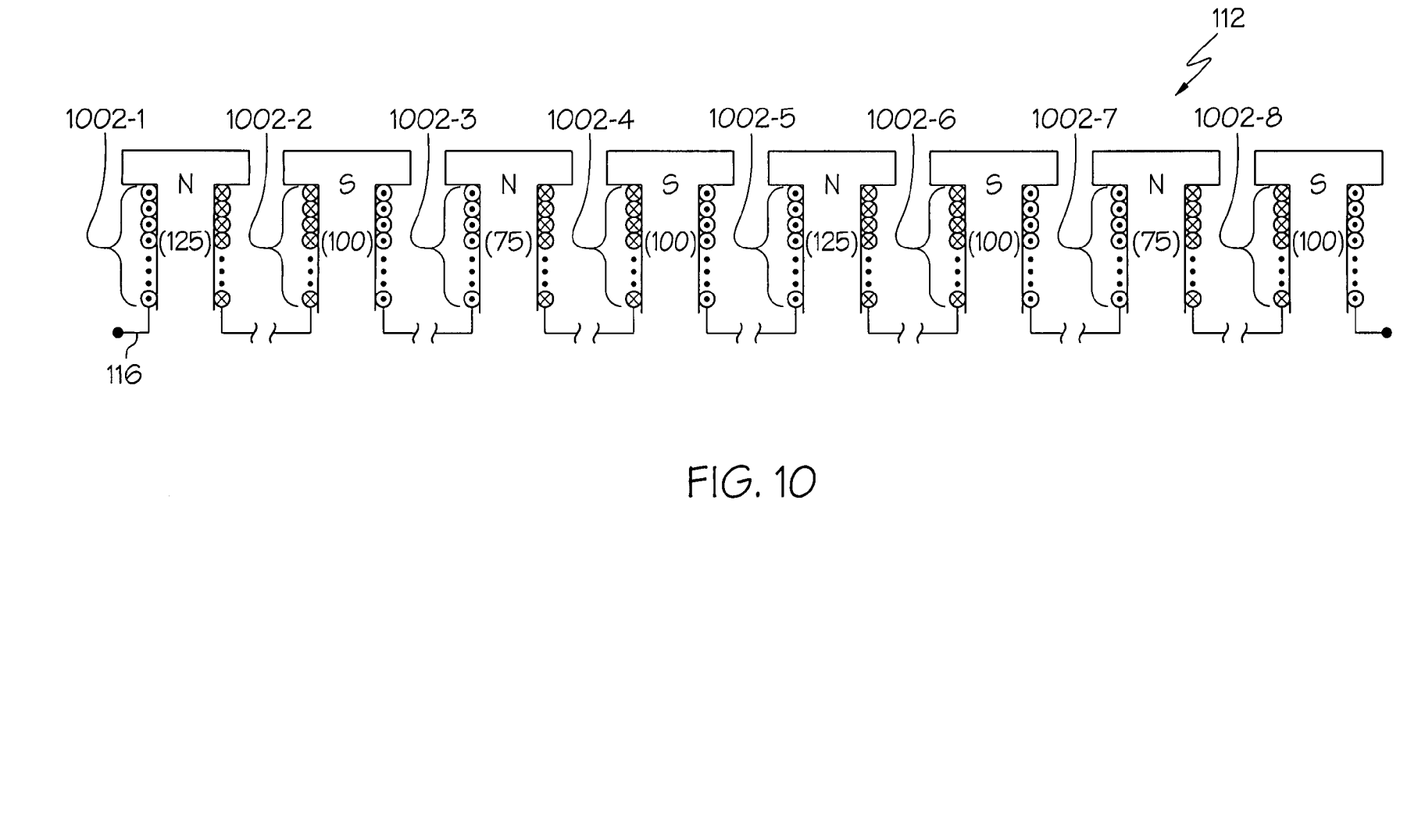
FIG. 10 is a schematic representation of the exemplary rotor that generates the MMF distribution of FIG. 9.

Turning now to FIGS. 9 and 10, the manner in which the single main field winding 116 of the starter-generator system 100 is wound to simultaneously generate both the 8-pole MMF distribution and the 4-pole MMF distribution of FIGS. 5 and 7, respectively, is depicted. As FIG. 10 depicts, the main field winding 116 includes eight coils 1002 (e.g., 1002-1, 1002-2, 1002-3, . . . , 1002-8); however, the rotor coils 1002 do not all have the same number of turns. Rather, although some of the rotor coils 1002 do have the same number of turns, electrically adjacent rotor coils 1002 have unequal numbers of turns. In other words, the first rotor coil 1002-1 is electrically adjacent to, and has a different number of turns than, the second rotor coil 1002-2, the second rotor coil 1002-2 is electrically adjacent to, and has a different number of turns than, the first rotor coil 1002-1 and the third rotor coil 1002-3, and so on. Moreover, the coils 1002 are wound such that when the main field coil 116 is electrically excited, every other coil 1002 will each generate MMFs of the same polarity. Thus, the first, third, fifth, and seventh coils 1002-1, 1002-3, 1002-5, 1002-7 will each generate MMFs of the same polarity, as will the second, fourth, sixth, and eighth coils 1002-2, 1002-4, 1002-6, 1002-8.

In the depicted embodiment, it is seen that the first and fifth coils 1002-1, 1002-5 each have 125 turns, the second, fourth, sixth, and eighth coils 1002-2, 1002-4, 1002-6, 1002-8 each have 100 turns, and the third and seventh coils 1002-3, 1002-7 each have 75 turns. The MMF distribution generated by the rotor 112 when the main filed winding 116 of FIG. 10 is electrically excited is depicted in FIG. 9. It is seen therein that when the main field winding 116 is electrically excited, it generates an MMF distribution that is equivalent to the resultant of two MMF distributions, one being the MMF distribution generated by a rotor wound as an 8-pole rotor, and the other being the MMF distribution generated by rotor wound as a 4-pole rotor. Thus, as may be appreciated, the main field winding 116 concomitantly generates a first electromagnetic flux pattern of an 8-pole rotor and a second electromagnetic flux pattern of a 4-pole rotor.

In the embodiments described above, the main stator winding sets 128 were described as being wound to implement four and eight stator poles. It will be appreciated that this combination of stator pole numbers is merely exemplary, and the main stator winding sets 128 could be wound to implement any one of numerous combinations of stator poles. Preferably, the number of stator poles each winding set 128 implements is unequal. In a particular preferred embodiment when one stator winding set 128-1 is wound to implement P-number of poles, the other stator winding set 128-2 is wound to implement (2×P×N)—number of poles, where P is an integer greater than or equal to 2 and N is an integer greater than or equal to 1.

It will additionally be appreciated that the number of turns of each rotor coil that comprises the main field winding 116 may vary, and the ratio between the number of turns associated with each generated MMF distribution may also vary. For example, in the embodiment depicted in FIGS. 9 and 10, the turns ratio of the 8-pole MMF distribution to the 4-pole MMF distribution was 4:1. However, this ratio may be varied to meet power generation requirements. For example, using the above-described embodiments, if 4-pole stator winding 128-2 needs to supply twice as much power as the 8-pole stator winding 128-1, then the main field winding 116 will be wound such that ratio of the 8-pole MMF distribution to 4-pole MMF distribution will be 1:2. Moreover, although the number stator poles and the number of rotor poles are preferably equal, this is also merely exemplary of a particular preferred embodiment.

As was previously noted, during operation of the starter-generator system 100 in the generator mode, the control unit 130 supplies the electrical excitation energy to the exciter field winding 118 and, via this electrical excitation, regulates the power output of the starter-generator system 100. In this regard, the control unit 130 receives signals representative of the power being supplied by one or more of the stator winding sets 128 and, in response to these signals, controls the electrical excitation of the exciter field winding 118, and thus the electrical excitation of the main field winding 126. It will be appreciated that in a particular preferred embodiment, the control unit 130 is coupled to receive signals representative of the electrical power being supplied from the stator winding set 128 that is generating the most amount of electrical power. It will be appreciated, however, that this is merely exemplary and that the control unit 130 could regulate on a stator winding set that is not generating the most electrical power. It will additionally be appreciated that the control unit 130 could be configured to regulate on more than stator winding set 128 if the control unit 130 has information stored therein that is representative of the load profiles of each stator winding set 128.

As was also noted previously, when the starter-generator system 100 is operating in the motor mode, one or more of the stator winding sets 128 is supplied with AC power from one or more of the AC power sources 170. It will be appreciated that the AC power supplied from each AC power source 170 is controlled as a function of rotor 122 position and speed. As an example, it is assumed that the exemplary starter-generator system 100 depicted in FIG. 1, which includes two stator winding sets 128-1, 128-2, is implemented with the main field winding 126 and stator winding set 128 configurations depicted in FIGS. 3 and 10, respectively. In order to rotate the main rotor 112 of this starter-generator system 100 at 12,000 rpm., first and/or second AC power sources 170-1 and/or 170-2 would be configured to supply AC power to the first and/or second winding sets 128-1 and/or 128-2 at 800 Hz and/or 400 Hz, respectively.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A starter-generator, comprising:
   a rotor configured to rotate and having a single main field winding wound thereon that, upon electrical excitation thereof, generates an electromagnetic flux; and
   a stator disposed at least partially around at least a portion of the rotor and having at least a first stator winding set and second stator winding set independently wound thereon, the first stator winding set configured to implement a first number of stator poles and, upon receipt of the electromagnetic flux, to have AC currents induced therein at a first frequency, the second stator winding set configured to implement a second number of stator poles and, upon receipt of the electromagnetic flux, to have AC currents induced therein at a second frequency,
   wherein the first and second number of stator poles are unequal and the first and second frequencies are unequal.

2. The starter-generator of claim 1, wherein:
   the main field winding is wound on the rotor such that, upon electrical excitation thereof, the main field winding generates a first electromagnetic flux pattern of a first number of rotor poles and a second electromagnetic flux pattern of a second number of rotor poles; and
   the first and second number of rotor poles are unequal.

3. The starter-generator of claim 2, wherein:
   the first number of stator poles and the first number of rotor poles are equal; and
   the second number of stator poles and the second number of rotor poles are equal.

4. The starter-generator of claim 1, wherein:
   the main field winding comprises a plurality of rotor coils electrically coupled in series;
   each rotor coil comprises a number of turns and is electrically coupled in series with at least one other rotor coil; and
   the number of turns of each rotor coil is unequal to the number of turns of the at least one other rotor coil.

5. The starter-generator of claim 1, further comprising:
   a control unit coupled to receive one or more signals representative of electrical power supplied by one or both of the first and second sets of stator windings and operable, in response thereto, to control the electrical excitation of the main field winding.

6. The starter-generator of claim 5, further comprising:
an exciter rotor having a set of exciter armature windings wound thereon;
an exciter stator disposed at least partially around at least a portion of the exciter rotor and having an exciter field winding wound thereon, the exciter field winding coupled to the control unit; and
one or more rectifier assemblies electrically coupled in series between the exciter armature windings and the single main field winding.

7. The starter-generator of claim 6, wherein the control unit, in response to one or more signals representative of electrical power supplied by one or both of the first and second sets of stator windings, controls electrical excitation of the exciter field winding, to thereby control the electrical excitation of the single main field winding.

8. The starter-generator of claim 5, wherein:
the first and second sets of stator windings are each configured to supply an amount of electrical power; and
the control unit is coupled to receive the one or more signals representative of supplied electrical power from that set of stator windings that is supplying a greater amount of electrical power.

9. The starter-generator of claim 5, wherein:
the first and second sets of stator windings supply electrical power in accordance with first and second load profiles, respectively; and
the control unit is coupled to receive the one or more signals representative of supplied electrical power from both the first and second sets of stator windings.

10. The starter-generator of claim 1, wherein:
the first stator winding set is further configured, upon being electrically excited with AC power of a first frequency, to generate a magnetic field that rotates at a first speed;
the second stator winding set is further configured, upon being electrically excited with AC power of a second frequency, to generate a magnetic field that rotates at a second speed;
the single main field winding is further configured to electromagnetically interact with one or more of the rotating magnetic fields, to thereby generate a torque and cause the rotor rotate; and
the first and second number of stator poles are unequal and the first and second frequencies are unequal.

11. The starter-generator of claim 1, wherein the rotor is a cylindrical rotor.

12. The starter-generator of claim 1, wherein the rotor is a salient pole rotor.

13. A starter-generator, comprising:
a stator having at least a first stator winding set and second stator winding set independently wound thereon, the first stator winding set configured to implement a first number of stator poles and, upon electrical excitation thereof with AC power of a first frequency, to generate a magnetic field that rotates at a first speed, the second stator winding set configured to implement a second number of stator poles and, upon electrical excitation thereof with AC power of a second frequency, to generate a magnetic field that rotates at a second speed; and
a rotor disposed at least partially within at least a portion of the stator and configured to rotate, the rotor having a single main field winding wound thereon that electromagnetically interacts with one or more of rotating the magnetic fields, to thereby generate a torque and rotate,
wherein the first and second number of stator poles are unequal and the first and second frequencies are unequal.

14. The starter-generator of claim 13, wherein:
the single main field winding is further configured, upon electrical excitation thereof, to generate an electromagnetic flux;
the first stator winding set is further configured, upon receipt of the electromagnetic flux, to have AC currents induced therein at a first frequency;
the second stator winding set is configured, upon receipt of the electromagnetic flux, to have AC currents induced therein at a second frequency; and
the first and second frequencies are unequal.

15. The starter-generator of claim 13, wherein:
the main field winding is wound on the rotor such that, upon electrical excitation thereof, the main field winding generates a first electromagnetic flux pattern of a first number of rotor poles and a second electromagnetic flux pattern of a second number of rotor poles; and
the first and second number of rotor poles are unequal.

16. The starter-generator of claim 15, wherein:
the first number of stator poles and the first number of rotor poles are equal; and
the second number of stator poles and the second number of rotor poles are equal.

17. The starter-generator of claim 13, wherein:
the main field winding comprises a plurality of rotor coils electrically coupled in series;
each rotor coil comprises a number of turns and is electrically coupled in series with at least one other rotor coil; and
the number of turns of each rotor coil is unequal to the number of turns of the at least one other rotor coil.

18. A starter-generator, comprising:
a rotor configured to rotate and having a single main field winding wound thereon; and
a stator having at least a first stator winding set and second stator winding set independently wound thereon, the first stator winding set configured to implement a first number of stator poles, the second stator winding set configured to implement a second number of stator poles,
wherein:
the single main field winding (i) upon electrical excitation thereof, generates an electromagnetic flux, and (ii) upon electromagnetic interaction with one or more rotating magnetic fields, generates a torque and causes the rotor to rotate,
the first stator winding set is configured such that (i) upon receipt of the electromagnetic flux generated by the single main field winding, AC currents are induced therein at a first frequency, and (ii) upon electrical excitation thereof with AC power of a first frequency, a magnetic field that rotates at a first speed is generated thereby and interacts with the single main field winding,
the second stator winding set is configured such that (i) upon receipt of the electromagnetic flux generated by the single main field winding, AC currents are induced therein at a second frequency, and (ii) upon electrical excitation thereof with AC power of a second frequency, a magnetic field that rotates at a second speed is generated thereby and interacts with the single main field winding,
the first and second number of stator poles are unequal, and
the first and second frequencies are unequal.

19. The starter-generator of claim 18, wherein:

the main field winding is wound on the rotor such that, upon electrical excitation thereof, the main field winding generates a first electromagnetic flux pattern of a first number of rotor poles and a second electromagnetic flux pattern of a second number of rotor poles; and the first and second number of rotor poles are unequal.

20. The starter-generator of claim 19, wherein:

the first number of stator poles and the first number of rotor poles are equal; and the second number of stator poles and the second number of rotor poles are equal.

\* \* \* \* \*